April 22, 1947.    H. B. CARBON    2,419,481
VALVE STRUCTURE
Filed June 9, 1944    2 Sheets-Sheet 1
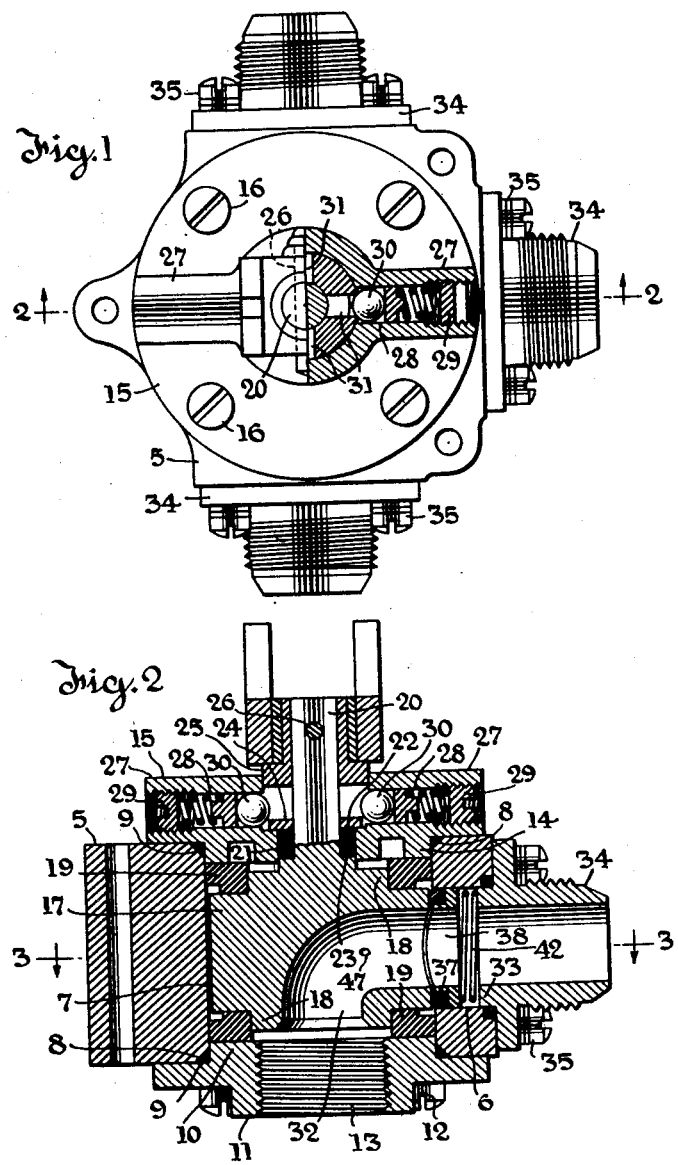
Inventor
Harry B. Carbon April 22, 1947.   H. B. CARBON   2,419,481
VALVE STRUCTURE
Filed June 9, 1944   2 Sheets-Sheet 2
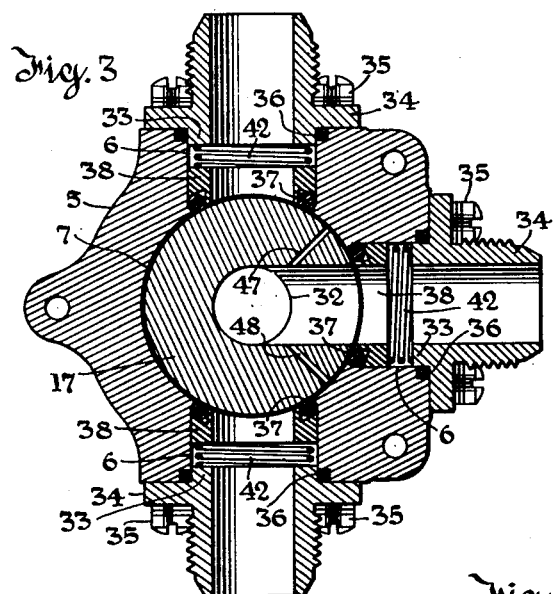
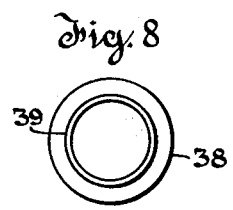
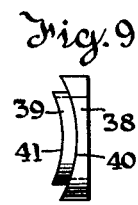
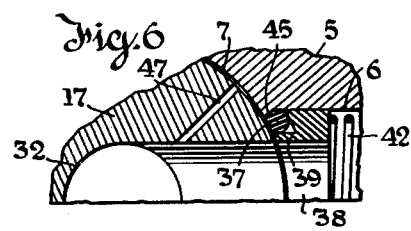
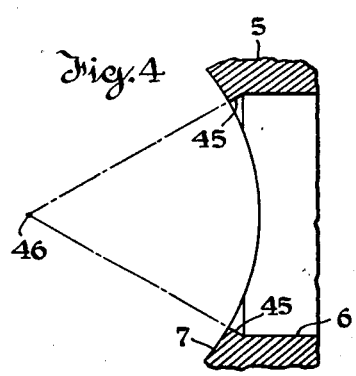
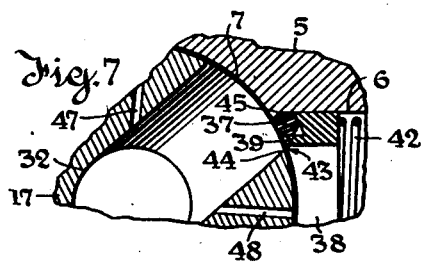
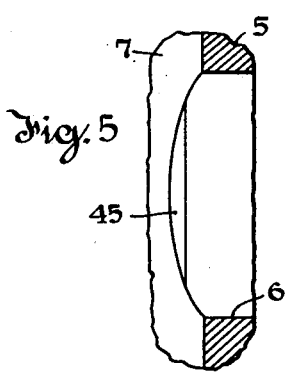
Inventor
Harry B. Carbon
Mason, Porter & Diller
Attorneys Patented Apr. 22, 1947

2,419,481

UNITED STATES PATENT OFFICE 2,419,481

VALVE STRUCTURE

Harry B. Carbon, Cleveland, Ohio, assignor to The Parker Appliance Company, Cleveland, Ohio, a corporation of Ohio Application June 9, 1944, Serial No. 539,513

10 Claims. (Cl. 251—113)

The invention relates generally to valves and primarily seeks to provide a novel valve structure embodying a casing having at least one inlet port and at least one outlet port, a rotor having a flow passage therethrough and turnable for permitting or preventing flow of fluid through said ports and passage, sealing ring means carried by the casing and surrounding a port therein and yieldably engaging the rotor for sealing off the ring surrounded port when the rotor is turned so as to place the flow passage therein out of registry with said ring surrounded port, and novel means for preventing pinching of the sealing ring means between the rotor and the casing as the flow passage in the rotor is moving past said ring means.

In employment of valve structures of the character stated, examples of which are disclosed in the application for U. S. Letters Patent filed by Arthur L. Parker on April 8, 1944, and identified by Serial Number 530,172, it has been noted that there is a tendency for the sealing ring means to project from its mounting groove in the casing and become pinched between the rotor and the casing as the flow passage in the rotor moves past said ring means. This is caused in part by frictional contact between the rotor and the sealing ring means and resulting pressure of the ring means against wall portions of the mounting groove bearing such angular relation to the direction of force application as to tend to crowd the sealing means out of the mounting groove and into the passing rotor flow passage, and in part by passage of fluid at very high velocity into the rotor passage as it approaches an out-of-registry position with respect to a given casing port controlled thereby and the resulting sort of wire drawing or orificing effect tending to suck the adjacent portion of the sealing ring means out of its mounting groove and into said passing rotor flow passage. Obviously such pinching of the sealing ring means is objectionable, and this problem is subject to only partial solution by providing clearances and rounded edges at critical points on the rotor or casing. It is the purpose of the present invention to provide novel means for preventing this objectionable pinching of the port sealing rings.

In its more detailed nature the invention resides in so forming the casing portions which cooperate in providing the sealing ring mounting grooves as to present overhanging lips or shoulders engaged by the sealing rings in a manner for resisting displacement thereof from the mounting grooves either by force of frictional contact or by the before mentioned sucking action due to pressure orificing effect.

Another object of the invention is to provide overhanging lips or shoulders of the character stated directly in the casing port walls, said port walls in part forming the sealing ring mounting grooves.

Another object of the invention is to provide a novel combination of the overhanging lips or shoulders for mechanically retaining the sealing rings in their mounting grooves, and means for preventing objectionable pressure build up in a casing port as the rotor is moving to the port closing position, thereby to minimize the tendency for the sealing ring to be sucked out of its mounting groove due to the before mentioned pressure orificing effect.

With the above and other objects in view that will hereinafter appear, the nature of the invention will be more clearly understood by reference to the following detailed description, the appended claims, and the several views illustrated in the accompanying drawings.

In the drawings:

Figure 1 is a plan view of a valve structure embodying the invention, parts being broken away and in section.

Figure 2 is a vertical cross section taken on the line 2—2 on Figure 1.

Figure 3 is a horizontal section taken on the line 3—3 on Figure 2, the rotor being turned to a position in which the flow passage therein is in registry with one of the casing ports.

Figure 4 is an enlarged fragmentary sectional view illustrating the inner end of one casing port and the ring retaining lips therein.

Figure 5 is a view similar to Figure 4 but taken in a plane at right angles to the section Figure 4.

Figure 6 is an enlarged fragmentary sectional view illustrating the rotor flow passage and the casing port in registering relation.

Figure 7 is a view similar to Figure 6 illustrating the rotor as turned away from the port and passage registering position, but not quite to a position for closing off the port.

Figure 8 is a face view of one of the sealing ring followers.

Figure 9 is an edge view of the follower shown in Figure 8.

In the disclosure herein presented exemplifying the invention, the novel features are shown as incorporated in a valve in which the casing has three inlet or delivery ports arranged in a common horizontal plane and a single downwardly directed inlet or outlet port, and the rotor has an elbow flow passage turnable into registry with a selected one of the group of three ports for bringing about flow communication between the selected one of the three ports and the downwardly directed port, or the rotor can be turned to close off communication with all three of the horizontally disposed ports.

In the form of the invention herein disclosed, the valve structure includes a casing 5 having three radially disposed bores 6 all arranged in a common horizontal plane. Each of the bores 6 opens into a large cylindriform rotor bore 7, and each end of the rotor bore is chamfered as at 8 to provide a seat for a sealing ring 9. The sealing ring at the bottom of the valve surrounds a boss 10 extending from a closure cap 11 which is screw secured as at 12 to said casing and which holds the ring in tight sealing contact with its seat. The cap 11 is equipped with a central inlet or discharge port 13.

The sealing ring or gasket 9 at the top of the valve surrounds a boss 14 extending from a closure cap 15 which is screw secured as at 16 in the casing, and the boss 14, like the previously mentioned cap boss 10, extends into the respective end of the rotor bore 7.

A valve rotor 17 is freely rotatably mounted in the rotor bore 7 and is equipped with bearing hubs 18 at the respective ends thereof which are rotatably received in non-metallic bearing rings 19 mounted in the casing in a manner clearly illustrated in Figure 2. The rotor includes a reduced diameter stem extension 20 which passes through a center bore 21 in the cap 15 wherein it is surounded by packing rings 22 disposed between the stem shoulder 23 and an abutment ring 24 surrounding the same in spaced relation to said shoulder.

The cap 15 also has a counterbore within which is received the collar 25 which is pin secured as at 26 upon the end of the rotor stem which extends out of the casing. The cap 15 also is equipped with a raised rib 27 having a longitudinal bore 28 therethrough in each end of which is threadedly mounted an abutment screw 29 and a spring pressed ball or detent 30. Each ball or detent 30 is engageable in a recess 31 formed in the external surface of the collar 25, four such recesses being provided in equidistantly spaced relation. The spring pressed elements 30 serve to yieldably hold the rotor in selected positions or stations each disposed in ninety degree spaced relation about the rotor center.

The rotor 17 is provided with an elbow flow passage 32 which constantly comunicates with the casing bottom port 13 at one end and has its other end presented for selective communication with the several casing ports 6. The yieldable detent and recess equipments 30, 31 will yieldably retain the rotor in the off position in which its flow passage 32 will be out of communication with all of the casing ports, or it will be yieldably held in position for registering with any selected one of the casing ports in the manner clearly illustrated in Figures 2 and 3 of the drawings.

Into the outer end of each casing bore 6 is fitted the positioning boss 33 of a port adapter 34 which is screw secured as at 35 to the casing. See Figure 1. A sealing gasket 36 is interposed between each adapter and the casing in the manner illustrated in Figures 2 and 3.

In each casing bore 6 is mounted a sealing ring 37, each said ring being disposed in a mounting groove defined at its outer face by the inner wall of the respective casing bore 6, and at its bottom inner face by the follower ring 38 mounted in the respective casing port. It will be observed by reference to Figures 2, 3, 8 and 9 of the drawings that each ring 37 is provided with an extension sleeve portion 39 forming the inner wall of the respective sealing ring mounting groove, and the groove bottom forming wall of the ring and the inner edge of the sleeve extension 39 are arcuately shaped as at 40 and 41 respectively to conform to the curvature of the periphery of the rotor 17. A compression spring 42 disposed between each follower ring 38 and the adjacent adapter end serves to urge the ring toward the rotor 17 and yieldably press the sealing ring 37 in sealing contact with the external surface thereof.

As the rotor is turned toward a port closing position in the manner illustrated in Figure 7 the trailing edge portion of the rotor flow passage 32 gradually closes the respective casing port, and a restricted passage or orifice 43 is formed between the rounded trailing edge portion 44 of the rotor flow passage just prior to attainment by the rotor of the port closing position. This restriction of the flow communication between the casing port and the rotor flow passage naturally causes building up of pressure in the casing port, and fluid passing through the orifice 43 at high velocity acts in a sort of wire drawing fashion to suck the sealing ring 37 out of its mounting groove, thus causing the trailing edge portion 44 of the rotor flow passage 32 to engage and pinch the sealing ring. Obviously frequent pinching of the sealing ring in this manner, if not prevented, would ultimately cause destruction of the sealing effect of the ring. This sucking of the sealing ring out of its mounting groove and pinching thereof by the rotor as it turns past the port closing position is prevented by provision of novel means which will now be described.

The tendency to draw the sealing rings 37 out of their mounting grooves is thwarted by the provision of overhanging lips or shoulders 45. While these sealing ring displacement preventing lips may be formed and shaped in various different ways, one simple way of making these lips is shown in Figures 4 and 5. As shown in Figure 4 the port bore 6 only partially breaks through into the rotor bore 7. The drill for drilling the casing port bores 6 preferably has a cone point of such angle that its vortex coincides with the center line of the rotor bore as at 46 in Figure 4 when the drilling of a given casing port 6 is completed. In this manner there are left two diametrically opposed lips or shoulders 45 which are directed radially toward the center point 46, as shown in Figures 4, 6 and 7. One of the lips 45 is shown in elevation in Figure 5 from which it will be apparent that each lip gradually diminishes in thickness lengthwise thereof from the center to each end, the greatest width of retaining wall being disposed at the only point at which orificing and pinching can occur. While it is, of course, possible to provide retaining shoulders extending to greater lengths, or even all the way around the ring, within the scope of the present invention, it will be readily apparent that it is only necessary to have the lips at the diametrically opposed portions because that is the only place at which pinching can occur.

It will be apparent by reference to Figure 7 that each lip wall 45 bears right angular relation to the friction drag force tending to force the sealing ring 37 out of its mounting groove and into the rotor flow passage and thus there is no force component tending to objectionably displace the ring from said groove.

The invention also comprehends the provision of means in combination with the retaining lips 45 for preventing objectionable pressure build up in a casing port as the rotor is moving to the port closing position, thereby to minimize the tendency for the sealing rings to be sucked out of their mounting grooves due to passage of fluid at great velocity through the restricted passage shown at 43 in Figure 7. This is accomplished by providing the valve rotor 17 with bleed ports 47 and 48, one thereof being disposed at each side of the flow passage 32 in the plane in which the casing ports lie. These ports extend into the rotor flow passage 32 and through the rotor periphery, and one or the other thereof, depending upon the direction of rotation of the rotor, maintains flow communication between a given casing port and the rotor flow passage as the trailing edge portion of the rotor flow passage approaches the casing port cut-off position as shown in Figure 7 so as to avoid sucking of the sealing ring 37 out of its mounting groove and into the rotor flow passage where it is likely to be pinched between the advancing edge 44 and the casing wall portion which it approaches.

The bleed port equipment 47 and 48 standing alone forms no part of the present invention, this specific arrangement being covered in the copending application for U. S. Letters Patent Serial Number 539,514 filed by Joseph F. Melichar on June 9, 1944. As before stated, however, the present invention does comprehend the combination of the port pressure reducing bleed ports with the retainer lips 45 which cooperate with said bleed ports in preventing any displacement of the sealing rings from their mounting grooves which might result in pinching of the rings.

While one form of the invention has been shown for purposes of illustration, it is to be clearly understood that various changes in the details of construction and arrangement of parts may be made without departing from the spirit and scope of the invention as defined in the appended claims.

I claim:

1. In a valve structure, a casing having at least one port therein, a rotor having a flow passage therethrough and turnable for permitting or preventing flow of fluid through said port and passage, said casing having an annular groove therein surrounding said port, a sealing ring of yieldable material mounted in and extending from said groove in sealing contact with the external surface of said rotor, said groove having its outer wall defined by a port bore in the casing and its bottom and inner wall defined by a ring mounted in said port bore and having an inner diameter approximately the same as the rotor flow passage, and means in said port bore confining the sealing ring groove against displacement of the sealing ring from the groove into the flow passage of the rotor, thereby to prevent pinching of the sealing ring.

2. In a valve structure, a casing having at least one port therein, a rotor having a flow passage therethrough and turnable for permitting or preventing flow of fluid through said port and passage, said casing having an annular groove therein surrounding said port, a sealing ring of yieldable material mounted in and extending from said groove in sealing contact with the external surface of said rotor, said rotor being generally cylindriform in shape and said casing having a rotor bore in which to rotatably mount the rotor, said groove having its outer wall defined by a port bore in the casing and its bottom and inner wall defined by a ring mounted in said port bore and having an inner diameter approximately the same as the rotor flow passage, and said port bore having a cylindriform portion disposed radially with respect to the center of the rotor and extending into the rotor bore at the upper and lower sides thereof in the upright center plane in which the rotor axis lies and terminating short of the rotor bore at its sides disposed in the direction of rotation of the rotor at which sides it is extended into the rotor bore in the form of inwardly directed sealing ring mounting groove confining wall portions effective to engage the sealing ring in its mounting groove and prevent displacement of the sealing ring into the rotor flow passage, thereby to prevent pinching of the ring.

3. A valve structure as defined in claim 2 in which the bore mounted ring and the groove bottom forming portion thereof are shaped to conform generally to the curvature of the rotor periphery.

4. In a valve structure, a casing having at least one port therein, a rotor having a flow passage therethrough and turnable for permitting or preventing flow of fluid through said port and passage, said casing having an annular groove therein surrounding said port, and a sealing ring of yieldable material mounted in and extending from said groove in sealing contact with the external surface of said rotor, said rotor having a port therein extending into the rotor flow passage and through the periphery of the rotor and disposed to maintain flow communication between the casing port and the rotor flow passage as the trailing edge portion of the rotor flow passage approaches the casing port cut-off position during movement of the rotor to a cut-off position so as to avoid sucking of the sealing ring out of its mounting groove and into the rotor flow passage due to an orificing effect of fluid pressure flow through the diminishing opening from the casing port into said flow passage and thus prevent pinching of the sealing ring between the advancing rotor flow passage defining edge portion and the ring mounting groove defining edge portion toward which it is turning, and means in part defining said sealing ring mounting groove and directly engaging the sealing ring therein in a manner for confining it against displacement from the groove, thereby augmenting the action of the rotor port in preventing displacement and pinching of the sealing ring.

5. In a valve structure, a casing having at least one port therein, a rotor having a flow passage therethrough and turnable clockwise or counterclockwise for permitting or preventing flow of fluid through said port and passage, said casing having an annular groove therein surrounding said port, and a sealing ring of yieldable material mounted in and extending from said groove in sealing contact with the external surface of said rotor, said rotor having a port therein at each side of the flow passage in the direction of rotation of the rotor, each said rotor port being disposed to maintain flow communication between the casing port and the rotor flow passage as the trailing edge portion of the rotor flow passage approaches the casing port cut-off position during movement of the rotor in one direction or the other to a cut-off position so as to avoid sucking of the sealing ring out of its mounting groove and into the rotor flow passage due to an orificing effect of fluid pressure flow through the diminishing opening from the casing port into said flow passage and thus prevent pinching of the sealing ring between the advancing rotor flow passage defining edge portion and the ring mounting groove defining edge portion toward which it is turning, and means in part defining each said sealing ring mounting groove and directly engaging the sealing ring therein in a manner for confining it against displacement from its mounting groove, thereby augmenting the action of the rotor ports in preventing displacement and pinching of the sealing ring.

6. In a valve structure, a casing having at least one port therein, a rotor having a flow passage therethrough and turnable for permitting or preventing flow of fluid through said port and passage, said casing having an annular groove therein surrounding said port, a sealing ring of yieldable material mounted in and extending from said groove in sealing contact with the external surface of said rotor, and means in part defining said groove and directly engaging said ring over only a limited portion of its circumference at each of the sides thereof diametrically oppositely disposed at the plane in which the port axis lies in the direction of rotation of the rotor and in position for confining said ring against displacement from the groove into the flow passage of the rotor, thereby to prevent pinching of the ring.

7. In a valve structure, a casing having at least one port therein, a rotor having a flow passage therethrough and turnable for permitting or preventing flow of fluid through said port and passage, said casing having an annular groove therein surrounding said port, a sealing ring of yieldable material mounted in and extending from said groove in sealing contact with the external surface of said rotor, and means forming a part of the casing and in part defining said groove and directly engaging said ring over only a limited portion of its circumference at each the sides thereof diametrically oppositely disposed at the plane in which the port axis lies in the direction of rotation of the rotor and in position for confining said ring against displacement from the groove into the flow passage of the rotor, thereby to prevent pinching of the ring.

8. In a valve structure, a casing having at least one port therein, a rotor having a flow passage therethrough and turnable for permitting or preventing flow of fluid through said port and passage, said casing having an annular groove therein surrounding said port, a sealing ring of yieldable material mounted in and extending from said groove in sealing contact with the external surface of said rotor, said groove having its outer wall defined by a port bore in the casing and its bottom and inner wall defined by an annular body mounted in and removable from said port bore and having an inner diameter approximately the same as the rotor flow passage, and means in said port bore confining the groove against displacement of the sealing ring from the groove into the flow passage of the rotor, thereby to prevent pinching of the sealing ring.

9. In a valve structure, a casing having at least one port therein, a rotor having a flow passage therethrough and turnable for permitting or preventing flow of fluid through said port and passage, said casing having an annular groove therein surrounding said port, a sealing ring of yieldable material mounted in and extending from said groove in sealing contact with the external surface of said rotor, said rotor being generally cylindriform in shape and said casing having a rotor bore in which to rotatably mount the rotor, said groove having its outer wall defined by a port bore in the casing and its bottom and inner wall defined by an annular body mounted in and removable from said port bore and having an inner diameter approximately the same as the rotor flow passage, and said port bore having a cylindriform portion disposed radially with respect to the center of the rotor and extending into the rotor bore at the upper and lower sides thereof in the upright center plane in which the rotor axis lies and terminating short of the rotor bore at its sides disposed in the direction of rotation of the rotor at which sides it is extended into the rotor bore in the form of inwardly directed sealing ring mounting groove confining wall portions effective to engage the sealing ring in its mounting groove and prevent displacement of the sealing ring into the rotor flow passage, thereby to prevent pinching of the ring.

10. A valve structure as defined in claim 9 in which the bore mounted annular body and the groove bottom forming portion thereof are shaped to conform generally to the curvature of the rotor periphery.

HARRY B. CARBON.

REFERENCES CITED

The following references are of record in the file of this patent:

UNITED STATES PATENTS

| Number | Name | Date |
|---|---|---|
| 221,288 | Dewrance | Nov. 4, 1879 |
| 743,511 | Huxley | Nov. 10, 1903 |
| 1,784,381 | O'Stroske | Dec. 9, 1930 |
| 2,290,349 | Ohls | July 21, 1942 |
| 2,297,161 | Newton | Sept. 29, 1942 |
| 2,310,583 | Johnson | Feb. 9, 1943 |

FOREIGN PATENTS

| Number | Country | Date |
|---|---|---|
| 370,228 | Italian | Apr. 11, 1939 |